United States Patent Office 2,940,856
Patented June 14, 1960

2,940,856
FEED COMPOSITIONS

Andre Geisendorf, Basel, and Konrad Streiff, Birsfelden, Switzerland, assignors to Hoffmann-La Roche Inc., Nutley, N.J., a corporation of New Jersey No Drawing. Filed Feb. 17, 1959, Ser. No. 793,683

Claims priority, application Switzerland July 29, 1958

7 Claims. (Cl. 99—4)

This invention pertains to feed compositions for poultry. More particularly, the invention relates to poultry feed compositions which result in improved yellow color of skin, shank, beak, fat and flesh as well as better colored egg yolks from the birds to which the compositions are fed.

Poultry with good color of skin, shank, beak, fat and flesh are preferred, especially in birds, such as broilers, intended for table use. A deep yellow color is also considered desirable in the yolks of eggs. The current practice of feeding poultry with fortified feed formulas deprives the birds of fresh, green forage which normally provides the pigment forming substances for the fowl. This results in paleness of color in both the poultry and in their egg yolks. Even the addition of dry green feeds does not satisfactorily compensate for the lack of fresh materials. The addition of pigmenting agents generally does not provide the desired hue and intensity, particularly in small concentrations and economically feasible proportions.

It has now been found that a feed composition containing as an essential ingredient an alkyl ester of 2,6,11,15 - tetramethyl - 17 - (2,6,6 - trimethyl - 1 - cyclohexen - 1 - yl) - 2,4,6,8,10,12,14,16 - heptadecaoctaen - 1 - oic acid in small concentrations will attain the desired yellow hue and intensity in egg yolks and in the skin, shank, beak, fat and flesh of poultry. Alkyl esters with up to 20 carbon atoms in the alcohol radical, such as the ethyl, propyl, butyl, cetyl esters and the like are preferred. The methyl ester shows particularly good pigmentation efficiency. For convenience, these compounds are referred to hereinafter in abbreviated form as "$C_{30}$ ester" or "$C_{30}$ esters." They may be produced synthetically according to the method described in copending application Serial No. 775,694, filed Novemebr 24, 1958, by Waldemar Guex et al.

The desired pigmentation of poultry or egg yolks may be effected by feeding compositions wherein the $C_{30}$ ester is admixed with a conventional poultry feed or the compound is incorporated in water used by the fowl for drinking purposes. A conventional poultry feed, e.g. a single feed or a mixed feed including added grain, such as those avaliable commercially may be used. The $C_{30}$ ester may be added to the basal ration as the pure, dry powder, as a stabilized concentrate wherein the ester is coated with a protective material such as gelatine or gelatine and sugar, as an adsorbate on silica gel, oat meal, soybean oil meal or as a simple mixture with a diluent, such as cereal meal, and oil meal and stabilizers, such as butylated hydroxy toluene, butylated hydroxy anisole, tocopherol, or the like, in solution in a vegetable oil, such as peanut oil, soybean oil, sesame oil, and the like (preferably including one or more stabilizers such as those enumerated above). An oil solution lends itself to mixing with or spraying on the basal ration. In addition, an emulsion or dispersion in peanut oil, soybean oil, or the like may be made and these are particularly adapted for aqueous compositions used as drinking water. It is preferable to form the feed composition by admixing the $C_{30}$ ester shortly before feeding especially if the $C_{30}$ ester is not stabilized and if an aqueous composition is used.

Approximately 0.5 mg. to 30 mg. of $C_{30}$ ester per kg. of feed should be used in the final composition provided to the poultry. Where a concentrate is used according to the preferred method of practicing this invention, e.g. a dry concentrate containing stabilizers, a vegetable oil solution, or an emulsion or dispersion for admixture with water, high proportions of $C_{30}$ ester, for example 3 to about 15 percent by weight of $C_{30}$ ester may be present. The concentrate is then admixed with the basal feed components so that the $C_{30}$ ester is present within the range expressed above. The $C_{30}$ ester containing composition may be fed from hatching time until the end of the fattening or raising period. In this case a proportion of $C_{30}$ ester on the low side of the above range may be used. It is possible to postpone the use of the feed composition containing $C_{30}$ ester until about the fifth week after hatching. For a shorter period of use, a higher concentration of $C_{30}$ ester is then better. The proportion of $C_{30}$ ester may also be varied within the limits given to obtain the desired hue and intensity of pigmentation.

The following examples are illustrative of the invention.

*Example 1*

A basal ration having the following composition was used:

| | Percent |
|---|---|
| Barley | 18.5 |
| Wheat | 30 |
| Rice | 15 |
| Bran | 10 |
| Peanut meal | 4 |
| Soybean meal | 5 |
| Alfalfa meal | 7 |
| Whey powder | 3 |
| Yeast | 2 |
| Lime | 2 |
| Bone meal | 1.3 |
| Mineral salts, trace elements, vitamins, antibiotics, coccidiostats | 2.2 |

2,6,11,15 - tetramethyl - 17 - (2,6,6 - trimethyl - 1 - cyclohexen - 1 - yl) - 2,4,6,8,10,12,14,16 - heptadecaoctaen-1-oic acid methyl ester in solution in peanut oil was thoroughly admixed with the basal ration daily in the following proportions:

I. 1 mg. $C_{30}$ ester (methyl ester) in 10 ml. peanut oil per kg. of basal ration.

II. 3 mg. $C_{30}$ ester (methyl ester) in 10 ml. peanut oil per kg. of basal ration.

III. 6 mg. $C_{30}$ ester (methyl ester) in 10 ml. peanut oil per kg. of basal ration.

*Example 2*

The feed compositions described in Example 1 containing the different concentrations of $C_{30}$ ester were fed according to conventional feeding practice to separate groups of Leghorn laying hens, each group containing 20 hens. The egg yolks from the laying hens were examined for color and compared with the color of the egg yolks obtained from the same hens prior to the use of feed composition containing the $C_{30}$ ester. Three days after the use of the feed compositions of Example 1 had begun, a darkening of the egg yolk became manifest. At the expiration of 14 days the final hue was reached and continued from that time. These experiments showed that feed composition I resulted in a light yellow coloration of the egg yolks, feed composition II effected an intermediate yellow coloring of the egg yolks and feed composition III produced a dark yellow coloration of the egg yolks.

*Example 3*

A group of 10 Leghorn broilers were fed feed composition III daily for 82 days beginning immediately after hatching. A control group of 10 similar birds were maintained on the basal ration alone. The two groups of broilers were then killed and compared as to color of skin, shank, beak and flesh. The birds fed composition III showed a marked yellow pigmentation which was significantly more intense than in the case of the control group.

We claim:

1. A feed composition containing as an essential ingredient an alkyl ester of 2,6,11,15 - tetramethyl-17 - (2,6,6 - trimethyl - 1 - cyclohexen - 1 - yl) - 2,4,6,8,10,12,14,16- heptadecaoctaen-1-oic acid.

2. A composition as in claim 1 wherein said ester is present in a proportion of 0.5 milligram to 30 milligrams per kilogram of feed.

3. A poultry feed composition containing as an essential ingredient therein 2,6,11,15-tetramethyl-17-(2,6,6-trimethyl - 1 - cyclohexen - 1 - yl) - 2,4,6,8,10,12,14,16-heptadecaoctaen-1-oic acid methyl ester.

4. A poultry feed composition comprising a basal ration and 0.5 milligram to 30 milligrams of 2,6,11,15-tetramethyl - 17 - (2,6,6 - trimethyl - 1 - cyclohexen - 1 - yl)-2,4,6,8,10,12,14,16-heptadecaoctaen-1-oic acid methyl ester per kilogram of feed composition.

5. A feed concentrate containing as an essential ingredient therein an alkyl ester of 2,6,11,15-tetramethyl-17 - (2,6,6 - trimethyl - 1 - cyclohexen - 1 - yl) - 2,4,6,8, 10, 12,14,16-heptadecaocta-1-oic acid.

6. A composition as in claim 5 wherein the lower alkyl ester is the methyl ester.

7. A process for improving the color of egg yolks and skin, shank and beak of poultry which comprises feeding poultry a composition containing as an essential ingredient therein an alkyl ester of 2,6,11,15-tetramethyl-17-(2,6,6 - trimethyl - 1 - cyclohexen - 1 - yl) - 2,4,6,8,10,12, 14,16-heptadecaoctaen-1-oic acid.

No references cited.

UNITED STATES PATENT OFFICE

CERTIFICATE OF CORRECTION

Patent No. 2,940,856 June 14, 1960

Andre Geisendorf et al.

It is hereby certified that error appears in the printed specification of the above numbered patent requiring correction and that the said Letters Patent should read as corrected below.

Column 4, line 13, for "-heptadecaocta-" read -- -heptadecaoctaen- --.

Signed and sealed this 8th day of November 1960.

(SEAL)
Attest:

KARL H. AXLINE
Attesting Officer

ROBERT C. WATSON
Commissioner of Patents